United States Patent Office 3,494,014
Patented Feb. 10, 1970

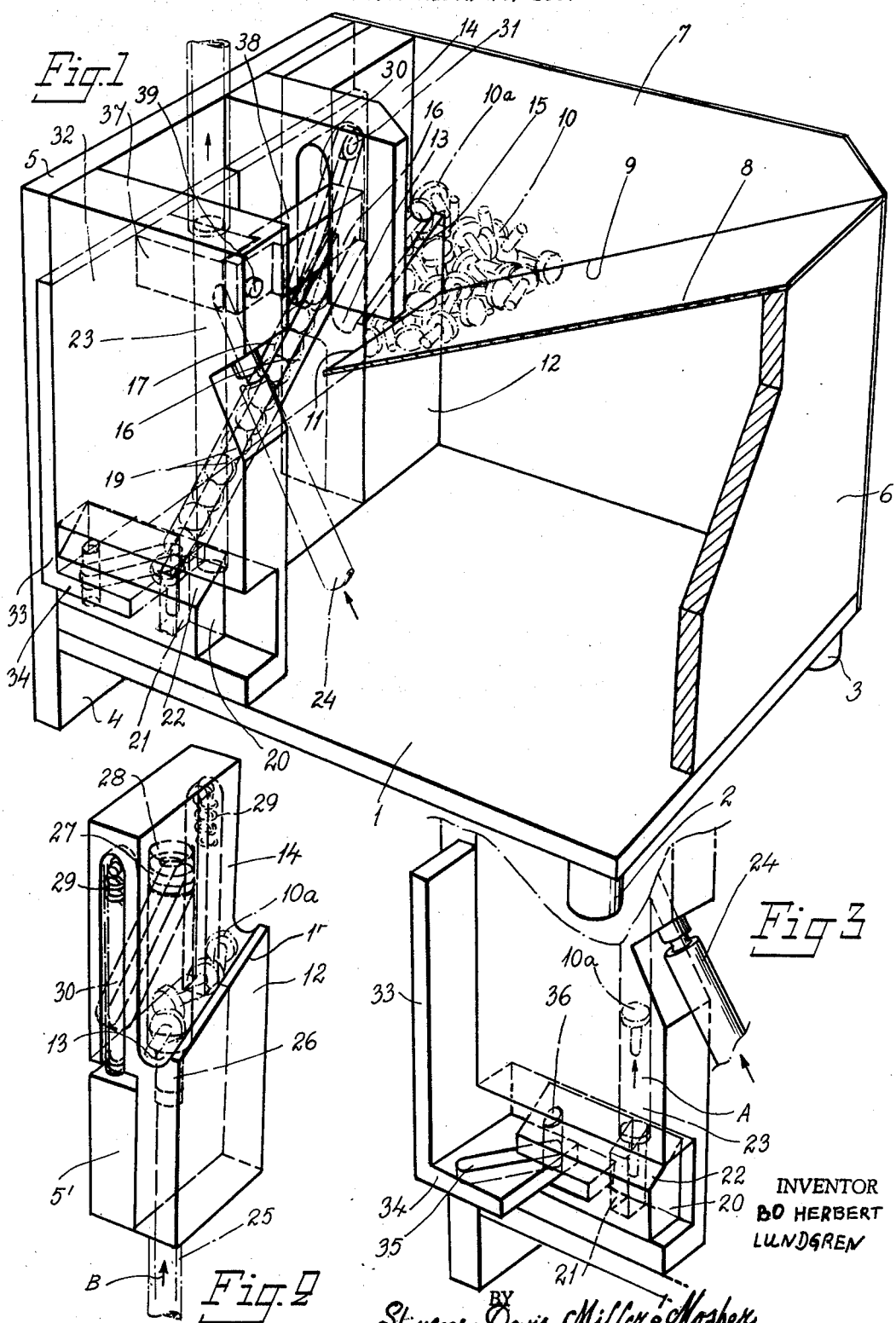

3,494,014
METHOD FOR AUTOMATICALLY ADVANCING ARTICLES WHICH PRESENT A SHANK PORTION AND A HEAD PORTION OR THE LIKE, AND AN AUTOMATICALLY OPERATING APPARATUS CARRYING OUT THE METHOD
Bo Herbert Lundgren, Tyreso, Sweden, assignor to Frank Dahlberg AB, Maria Skolgata, Stockholm, Sweden
Filed Mar. 24, 1967, Ser. No. 625,721
Claims priority, application Sweden, Apr. 1, 1967, 4,438/66
Int. Cl. B23q 7/10
U.S. Cl. 29—212    3 Claims

ABSTRACT OF THE DISCLOSURE

An apparatus for removing a small number of articles which present a head portion and a shank portion, such as screws, cotter pins, rivets, tire studs etc., from a place where a larger number of said articles are stored haphazardly, automatically aligning the articles in a uniform position and feeding the articles to a powered hand tool or other powered appliance by means of which they can be driven home in the workpiece.

BACKGROUND

The present invention relates to a method for automatically advancing such articles as screws, rivets, cotter pins, tire studs or the like which present a shank portion and a head portion, wherein the articles are taken from a magazine in which they are stored haphazardly and manipulated into a desired position of alignment during their period of transit.

It is becoming more and more usual to utilize in connection with requirements for increased working tempos different types of powered appliances, usually in the form of hand guns, to deliver such articles as screws, cotter pins, rivets and tire studs, or the like, which present a head portion and a shank portion, to the assembly position. This is particularly true for tire studs which are inserted one at a time in holes previously located in the tire, without it being necessary to handle the studs manually during the process. Tools of this type can be designed solely to deliver the article to its place of assembly; but tools are known in the art which in addition to delivering the article also perform the task of driving in the same. The manual contribution is thus restricted to aligning the tool with the workpiece and setting the tool in operation, by means of a trigger for instance; the operating medium of said tool usually comprising compressed air.

The principal object of the present invention is to effect in a simple manner, the automatic advancement of headed articles taken from a magazine in which they are stored in disarray, and simultaneously positioning said articles so that, subsequent to a certain amount of manipulation, they are aligned uniformly and, finally, can be further advanced singly, positioned in head-to-toe relationship, to a predetermined receiving station, from where each article can be rapidly removed, correctly turned, and passed to the relevant tool.

The invention is accordingly mainly characterized in that a small number of articles is intermittently collected, still in disarray, from the magazine and passed to a waiting station, in front of a chute the width of which is narrower than that of the head, and that the articles are transferred to the chute in such a way that the shank of the article can swing down in the chute whilst the head is held by the edges of the chute opening, whereupon the articles, so aligned, are conveyed further to a feeding means which feeds said articles singly in the desired position of alignment to a predetermined receiving station.

The invention is also concerned with an automatically operating apparatus designed to advance such articles as screws, rivets, cotter pins, tire studs or the like which present a head portion and a shank portion, whereby the articles are collected from a magazine, in which they are stored in no particular order, and manipulated into the desired position of alignment during their period of transit.

The aparratus is mainly characterized by a sweeper or pick-up means, adapted to collect a small number of said articles from their place of storage and transfer them, still in a disorderly relationship, to a waiting station in readiness for further advancement, one end of a chute being connected to said waiting station and the width of the chute being narrower than that of the head and having a depth which allows the shank portion of the article to swing down, under its own weight, into the chute, thus imparting to said articles a uniform position of alignment; wherein arrangements are provided for transferring the articles to the chute, and the other end of the chute coacting with a feeding means adapted to receive at least one article at a time and move it in a desired position of alignment to a predetermined receiving station.

The invention will now be described in detail with reference to an embodiment of the same, shown diagrammatically on the accompanying drawing, additional characterizing features of the invention being disclosed in conjunction therewith.

DETAILED DESCRIPTION OF INVENTION

FIGURE 1 shows in perspective an apparatus for advancing articles which present a head portion and a shank portion, and for manipulating said articles into a position of alignment while they are in a transit.

FIGURE 2 shows also in perspective a vertically movable slide serving as a pick-up means and forming a part of the apparatus shown in FIGURE 1.

FIGURE 3 shows, in enlarged scale, the left hand corner of the apparatus shown in FIGURE 1.

The method according to the invention is substantially based on the principle that a small or limited number of articles, such as screws, rivets, tire studs, are taken from a disorderly supply of such articles and transferred intermittently to a position in which they are completely separated from the supply or magazine. Accordingly, this position shall substantially coincide with the entrance to an open chute having longitudinally extending edges spaced apart at a distance which is less than the width of the heads, or the narrowest width of said heads when the heads are non-circular or irregular in shape.

Various types of displacing means are conceivable for transferring the collected articles to the chute, for instance, means in the form of an intermittently operating stream of air, or may comprise mechanical pushers or vibrating means. A simple method of effecting the transfer and also a certain continued advancement into the chute is to arrange for the collecting means, and similarly the chute, to be inclined at an angle whereby the force of gravity can be utilized to effect the feeding operation. Immediately the articles are transferred to the chute the edges of said chute engage the heads of the articles, whereby the shank, because of gravity, automatically endeavors to swing downwards around the captured heads. In this way the articles slide down the chute, one after the other, forming a line of uniformly aligned articles. Naturally, the invention is not restricted to the described arrangement for effecting the method; it being possible to arrange the collecting or pick up member and the chute in a substantially horizontal plane and transfer the articles to the chute in the manner indicated above.

Subsequent to the articles being automatically turned to face in the required direction in the manner described, it is possible, by means of a feeder extending transverse to the chute for instance, to transfer the uniformly aligned articles, one at a time, to a predetermined receiving station from which the article can be rapidly removed by, for instance, a feeder tube passing to a tool used for driving in the article, said tool, for instance, being in the form of a hand gun, or preferably a stationary tool. In the case where such tools are powered by compressed air it is possible, for instance, to utilize the return air from the tool to effect a strong flow of air in the feeder tube, creating a sub-pressure above the advanced article, which is thereby drawn into the flow of air and rapidly advanced further to its working position in the tool.

It is also possible to coordinate the advancing movements in a simple manner, so that these movements can be performed fully automatically, and many driving arrangements are conceivable for this purpose. However, it has been shown particularly advantageous, as well as simple, to use compressed air as a means of effecting the movements necessary to advance the articles.

An example of an arrangement for realizing the method is shown in FIGURES 1 to 3 in the drawing.

FIGURE 1 shows in perspective a substantially box-like frame work, comprising a base plate 1 supported by two feet 2 and 3, and resting on the downwardly projecting portion 4 of a stationary endwall 5. The reference numeral 6 in the drawing indicates an opposing end-wall plate, the end-wall plates 5 and 6 being connected at their distal ends, as seen in the drawing, by means of a guard plate 7. Extending obliquely downwards from the end plate 6 is a bottom plate 8, the long edge 9 of which sealingly abuts the guard 7 and which plate 8 is intended to abut a second guard plate (not shown), located on the side facing the viewer. In this way the substantially defining surfaces of a magazine are formed for receiving a disorderly pile 10 of articles, each of which presents a head portion or the like and a shaft portion. Thus, the intention is that articles can be emptied from their packages into the magazine without notice being taken of the position which they adopt therein. The lower edge 11 of the bottom plate 8 abuts relatively tightly against a vertically movable slide 12, a special view of which is shown in FIGURE 2. Thus, the slide normally prevents the pile 10 of articles from sliding out of their place of storage. In the shown embodiment the slide has been provided with a shoulder, formed by milling, which is designed with a convex groove 13 flanked by a surface 14 and an edge 15 adjacent to the surface which faces towards the bottom plate 8. The slide 12 is in FIGURE 1 shown in its passage upwards during the collecting movement, a small number of articles 10a, still in no particular order, being removed from the pile 10 and taking up a position in the chute 13. It is a natural assumption that guard means must be provided which, during the upward movement of the slide to the closed position, block the bottom opening of the chute 13 so that the articles do not slide out of the same. When the chute is lifted up into its upper stationary or waiting position the bottom opening of the chute 13 is meant to be completely unobstructed and coincide with the upper opening 16 of a stationary chute sloping at substantially the same angle as the chute 13, and which is provided with parallel extending edges 17 and 18, so spaced apart that the distance between them is less than the narrowest width of the heads of the articles. Consequently, when the chute 13 is caused to adopt a position which registers with the stationary chute, represented by the edges 17 and 18 in FIGURE 1, the transferred articles 10a located on the shelf or in the chute 13 automatically slide down into the stationary chute, under the influence of their own weight, the heads of said articles being retained above the edges 17 and 18 and the shaft portions of said articles automatically swinging down into the chute, due to the force of gravity.

In this way the articles obtained a uniform alignment, the heads all facing the same direction, and a line of articles 19 is quickly accumulated along the chute. However, the bottom portion of the stationary chute is covered by a feeder means 20, in the form of a slide capable of moving horizontally, transversally to the chute. As can best be seen from FIGURE 3, the slide 12 presents a recess or pocket 21 extending downwardly from the upper portion of the slide and which in rest position lies in front of the stationary chute; the bottom article automatically sliding into the pocket and thus obstructing the passage of the line 19 of following articles, still present in the chute. In the drawing the slide 20 presents an upper, inclined surface 22 which may slope at the same angle as the stationary chute and the chute 13 respectively. However, it is not necessary for the entire upper surface of the slide to be so inclined, since it is only necessary in certain instances for the area around the recess 21 to be provided with such inclined slide surfaces for the head of the articles.

According to the present invention it is quite conceivable to make the upper surface 22 completely horizontal or to give the same an arcuate shape so that the articles are able to slide easily from the stationary chute into the pocket 21, in the feeder 20. It is also conceivable within the scope of the invention to utilize mechanical, positively functioning separators which simultaneously force one article at a time from the line 19 in the stationary chute, into the recess 21. Further, it is also possible according to the invention, although not shown in the figures, to use a plurality of sequentially positioned recesses, similar to recess 21, to enable a plurality of mutually separated articles to be fed into the recesses and then to feed laterally all of said articles to their predetermined receiving station for further passage to different working positions. As can be seen from FIGURE 3 the slide 20 has been moved from a position which registers with the stationary chute to a closed position, represented by a pipe or the like 23, in which a flow condition is created by means of compressed air, e.g. return air from a tool which communicates via a connecting pipe 24 with the pipe 23, upstream of the pocket 21 in its advanced position. The arrow A in FIGURE 3 illustrates an article 10a entrained in the flow by the vacuum appearing above the head. By dimensioning the pipe so that it closely conforms with the dimension of the head, the article is prevented from changing its position of alignment, thus ensuring that the article arrives at the intended working station in the correct position.

In the described embodiment compressed air is used to effect the various advancing moments. As can be seen from FIGURE 2 the air is caused to flow via a delivery conduit 25 through a hollow piston rod 26 and a hollow piston 27 working in a piston cylinder 28 bored in the vertically movable slide. Consequently, when compressed air is caused to flow in the direction of arrow B through the piston rod 26 and the piston 27 and enters the piston cylinder 28 a cushion of air is formed, which forces the slide 12 to move upwards from a lower position, in which it collects the objects 10a, against the action of two inset return tension springs 29 positioned one on each side of the slide. Each of the return springs 29 is secured at its upper end to the slide 12 and at its lower end to a portion 5', in FIGURE 2, which is intended to be immovably secured to the plate 7 and the bottom plate 1. Further, an inclined groove 30 is cut in the distal surface of the slide, for a follower roller 31 shown in FIGURE 1. The roller 31 is mounted for rotation on a trunnion or the like secured to an L-shaped angle section 32, on the vertical leg or flange 33. The lower flange 34 of said angle section is slidably guided for horizontal movement along the end wall plate 5. When the slide 12 is consequently lifted by the action of the compressed air, from the collecting position up to the waiting station in front of the opening 16 of the stationary chute, the inclined groove 30, due to the cam action against the roller 31, forces the L-shaped section to move horizontally, towards the viewer. This movement is also used to move the slide 20 transversally; as can be easily seen from FIGURE 3. For this purpose a suitably through-passing groove 35 is cut in the bottom flange 34 of the L-shaped section, into which groove projects a follower pin 36 secured to the slide 20. When the flange 34 has moved towards the viewer the pin 36, due to the cam action of the groove 35, forces the slide to move so that the pocket 21 is shifted from a position lying opposite to the lower opening of the stationary chute, away to the pipe 23 where return air from the conduit 24 forcibly removes the article in the direction of arrow A. Obviously, instead of being provided with groove 35 and pin 36 the L-shaped section 32 may, for instance, present a cam surface coacting with one end face of the slide 20, which during one movement stroke of the L-shaped section so displaces the slide 12, against the action of a return spring, that the pocket 21 comes directly under the pipe 23.

When, subsequent to the chute 13 in slide 12 being emptied of its articles, the pressure medium is released from the piston cyliner 28 in the slide 12, the slide returns to its lower, collecting position where the next batch of articles automatically slide down in the chute 13, from the inclined plane 8. However, this downward movement of the slide results in the L-shaped section being returned, in a direction away from the viewer, to the distal end position, in readiness for the next operation. The return movement, furthermore, causes the groove 35 in flange 34 to act upon the pin 36 so that the slide 20 is returned to a position wherein the pocket 21 is again situated opposite to the lower opening of the stationary chute, so that the next article can slide automatically into the now empty chute. In this way the method is repeated automatically at intervals, thus saving much time and manual labour.

To prevent the article 19 from passing, for some reason or other, incorrectly positioned into the stationary chute (i.e. any position other than in which the shaft portion of the article depends from the chute while the head portion rests against the edges 17, 18) down along the stationary chute, a buffer 38 is secured to the flange 33 by means of a block or the like 37; which buffer may, to a limited extent, be free to pivot around a bolt 39 in the block 37. The buffer 38 is intended to sweep over the stationary chute in coordinated movement with the vertical movement of the slide 12 so that incorrectly aligned articles are knocked from the stationary chute when the slide 12 moves towards its bottom position.

The invention is not restricted to the shown and described embodiment but can be varied arbitrarily within the scope of the following claims.

What is claimed is:

1. An apparatus for feeding articles having end portions of different sizes to their place of assembly and cooperating with a pneumatic article applicator gun, said apparatus comprising a magazine in which the articles are stored in disarray, article collecting slide means presenting an inclined upper surface and adapted to collect on said surface articles from the magazine and transfer them to a waiting station, stationary inclined guide means presenting an elongated article portion receiving slot and cooperating with said article collecting slide to receive articles therefrom and to impart uniform alignment to said articles, and an article receiving slide having an article receiving pocket and being movable between an article receiving position beneath said article guide means and an article dispatch station remote from said receiving position, said dispatch station being connected to an article feed line cooperating with the article applicator gun, means for reciprocatingly moving the article collecting slide between a rest position and the waiting station, movement transmission means for synchronizing the movement of the article collecting slide and the article receiving slide, and duct means to feed return pressure air from the applicator gun to the feed line away from and upstream of the article receiving station, to create a partial vacuum in said line, to suck the article located in said receiving station through the feed line and into working positon n applicator gun.

2. The apparatus of claim 1, wherein the movement transmission means comprises camming mechanisms actuatable by the reciprocating movement of the article collecting slide.

3. The apparatus of claim 1, wherein the article collecting slide is moved in one direction by compressed air and returned in the other direction by spring means.

References Cited

UNITED STATES PATENTS

| 3,034,633 | 5/1962 | Clifford et al. | 198—33 |
| 3,161,274 | 12/1964 | Lanz | 193—43 |
| 3,367,015 | 2/1968 | Brosene | 29—212 |

THOMAS H. EAGER, Primary Examiner

U.S. Cl. X.R.

29—211; 193—43; 198—33